United States Patent
Goehlich et al.

(10) Patent No.: US 9,169,016 B2
(45) Date of Patent: Oct. 27, 2015

(54) METHOD AND DEVICE FOR THE INSTALLATION OF SYSTEMS, AND A FREIGHT LOADING SYSTEM

(75) Inventors: Robert Alexander Goehlich, Hamburg (DE); Cihangir Sayilgan, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 377 days.

(21) Appl. No.: 13/386,513

(22) PCT Filed: Jul. 22, 2010

(86) PCT No.: PCT/EP2010/060643
§ 371 (c)(1),
(2), (4) Date: Mar. 8, 2012

(87) PCT Pub. No.: WO2011/009916
PCT Pub. Date: Jan. 27, 2011

(65) Prior Publication Data
US 2012/0187248 A1  Jul. 26, 2012

Related U.S. Application Data

(60) Provisional application No. 61/227,802, filed on Jul. 23, 2009.

(30) Foreign Application Priority Data

Jul. 23, 2009 (DE) .................... 10 2009 034 416

(51) Int. Cl.
*B64C 1/20* (2006.01)
*B64D 9/00* (2006.01)
*B64F 5/00* (2006.01)

(52) U.S. Cl.
CPC ... *B64D 9/00* (2013.01); *B64C 1/20* (2013.01); *B64F 5/0036* (2013.01); *Y10T 29/49826* (2015.01)

(58) Field of Classification Search
CPC ........... B64D 9/00; B64C 1/20; B64F 5/0036; B64F 5/0009; Y10T 29/49826
USPC ........ 244/137.1; 29/429, 430, 897.2; 414/347
See application file for complete search history.

(56) References Cited

U.S. PATENT DOCUMENTS 2,334,124 A    11/1943  Peterson
3,170,553 A *   2/1965  McElroy .................... 193/35 C
(Continued)

FOREIGN PATENT DOCUMENTS

CH    349 493 A    10/1960
CN    101065287 A  10/2007
(Continued)

OTHER PUBLICATIONS

International Search Report for Appln. No. PCT/EP2010/060643 mailed May 16, 2011.
Stein et al., Eine neue Chance. Serienstarts von Produkten, MM Maschinenmarkt Das Industrie Magazin. 18/2005, Seite 22 bis 25, www.planfabrike.de/homepage/download/das_jahrhundert_projekt_maschinenmarkt.pdf.
(Continued)

*Primary Examiner* — Valentina Xavier
(74) *Attorney, Agent, or Firm* — Carter, DeLuca, Farrell & Schmidt, LLP

(57) ABSTRACT

Disclosed is a method for the installation of systems in an aeroplane fuselage, a device with a rails system for the execution of the method, and a freight loading system, which uses the rails system as a guidance system for cargo.

7 Claims, 2 Drawing Sheets

(56) References Cited

U.S. PATENT DOCUMENTS

| | | | |
|---|---|---|---|
| 4,699,337 A | 10/1987 | Lewis | |
| 2007/0001055 A1* | 1/2007 | Smetannikov et al. | 244/137.1 |
| 2007/0025832 A1 | 2/2007 | Rawdon et al. | |
| 2008/0250626 A1 | 10/2008 | Frankenberger et al. | |

FOREIGN PATENT DOCUMENTS

| | | |
|---|---|---|
| DE | 4238095 A1 | 5/1994 |
| DE | 19923489 A1 | 11/2000 |
| DE | 60311544 T2 | 11/2007 |
| JP | 06024547 A | 2/1994 |
| SU | 740689 | 6/1980 |
| WO | 2010/136102 A1 | 12/2010 |

OTHER PUBLICATIONS

Chinese Office Action dated Mar. 12, 2013 for CN 2013112801170160.

Chinese Office Action dated Sep. 7, 2014 for CN 2014070400891490.

Japanese Office Action dated Jul. 2, 2013 for JP 2012-521039.

German Office Action dated Jul. 23, 2009 for DE 10 2009 034 416.0-22.

Russian Office Action dated Jun. 5, 2013 for RU 2012106608/11(010006).

Chinese Office Action for CN 2015010900991900 dated Jan. 14, 2015.

* cited by examiner

METHOD AND DEVICE FOR THE INSTALLATION OF SYSTEMS, AND A FREIGHT LOADING SYSTEM

TECHNICAL FIELD

The invention concerns a device for the installation of systems in an aeroplane fuselage which has an opening, the opening being a front face side opening or rear face side opening, and a freight loading system for an aeroplane.

BACKGROUND

In aeroplane construction concepts for the installation of systems and concepts for freight loading systems are usually considered separately from one another. Thus in the concepts of known art no interfaces exist between systems installation and the freight loading systems, although in both cases individual elements are to be conveyed and accurately arranged in position in an aeroplane fuselage.

In a concept described in the applicant's patent application US 2008/0255026 A1 for the purpose of systems installation fuselage sections are each mounted on a conveyor vehicle and continuously moved in the transverse direction along a circuit from one build area to the next build area. A comparable concept with a cyclical movement of the conveyor vehicles is also of known art.

However, in these principles of assembly and/or installation of known art it is critical that the systems in question, such as runs and modules, also tools, accessories and small parts, must be individually moved into the fuselage by the assembly personnel to the installation site in question, which results in the expenditure of a large amount of time. In addition the larger systems and tools require a high level of physical effort from the assembly personnel.

Freight loading systems for cargo such as containers and items of luggage should enable the rapid loading and unloading of a freight compartment. Furthermore the freight loading systems should only have a low weight and should enable an almost total utilisation of the freight compartment.

A freight loading system of known art shown in DE 42 38 095 C2 envisages a conveyor belt extending in the longitudinal direction of the aeroplane, by means of which the cargo is conveyed into the freight compartment. This freight loading system allows good utilisation of the freight compartment, but a very powerful drive is required for movement of the conveyor belt.

Other freight loading systems envisage so-called roll mats, which are installed over a large surface area of the floor of the freight compartment. The roll mats are, however, relatively heavy, and are susceptible to contamination.

A freight loading system that can be compared with the roll mats is of known art from DE 603 11 544 T2. In this system a multiplicity of ball- and roller-type actuating drives, arranged next to one another in the longitudinal and transverse directions of the aeroplane, are envisaged for the movement of the cargo. The actuating drives are, however, susceptible to mechanical and electrical damage. Furthermore loading and unloading is time-intensive.

From the applicant's German patent application DE 199 23 529 A1 a freight loading system is of known art, in which the cargo is routed on rails extending in the longitudinal direction of the freight compartment. While the loading and unloading times or freight loading times are indeed reduced relative to the solutions described earlier, the cargo during loading must be scheduled in a previously defined sequence on the rails, since no repositioning of the cargo is possible within the freight compartment. Furthermore the cargo can only be introduced into the freight compartment through a front face side opening or rear face side opening, which limits the application of this freight loading system to freighter aeroplanes.

The object of the present invention is to create a method and a device for the installation of systems or system modules in an aeroplane fuselage, which remove the above-cited disadvantages and enable a rapid installation, also a freight loading system with reduced freight loading times, which has features of the device for the installation of systems.

SUMMARY

This object is achieved by a device for the installation of systems in an aeroplane fuselage with a longitudinal guideway extending through the opening into the aeroplane fuselage for accommodation of at least one cart that can be moved along the longitudinal guideway, wherein the longitudinal guideway has two parallel guideway sections, which are connected with one another via a curved section arranged in the aeroplane fuselage, and wherein the at least one cart is able to enter into the aeroplane fuselage through the opening along one of the two parallel guideway sections, is able to change direction along the curved section, and is able to exit from the aeroplane fuselage through the opening along the other of the two parallel guideway sections, and by a freight loading system with a rail-type longitudinal guideway arranged in an aeroplane, and a multiplicity of sledges routed on the rail-type longitudinal guideway for the accommodation of cargo, wherein the rail-type longitudinal guideway has a curved section for the purpose of altering the direction of the sledges, and wherein the rail-type longitudinal guideway has two parallel guideway sections, which are connected with one another via the curved section, wherein at least one sledge of the multiplicity of sledges is able to enter into an opening of an aeroplane fuselage along one of the two parallel guideway sections, is able to alter direction along the curved section, and is able to exit from the aeroplane fuselage through the opening along the other of two parallel guideway sections.

In an inventive method for the installation of systems a longitudinal guideway is firstly arranged in the aeroplane fuselage, extending in the longitudinal direction of the aeroplane fuselage. Then the systems to be installed are commissioned outside the aeroplane fuselage and are positioned on a cart in accordance with their commissioning. Subsequently the at least one cart is routed on the longitudinal guideway to the areas in which the systems are to be installed.

In the inventive method it is advantageous that the systems such as runs, modules, components, tools, accessories and similar no longer have to be conveyed manually and individually into the fuselage. The systems required are pre-commissioned outside the fuselage and are easily moved into the fuselage in accordance with their commissioning by means of the cart. By this means the installation time is reduced. In particular the commissioning can be undertaken by the suppliers, so that quasi-fully commissioned carts can be delivered. By this means the carts can be delivered in the required sequence and the installation time is further reduced. Furthermore in the inventive solution the physical loading on the assembly personnel is greatly reduced, since the systems no longer have to be carried into the aeroplane fuselage. With the use of a multiplicity of carts the installation of a plurality of systems can take place at the same time.

The longitudinal guideway is particularly simple to install if it is introduced into the aeroplane fuselage from the front face side or rear face side. The longitudinal guideway is preferably introduced into the aeroplane fuselage at the rear, and is positioned in the underfloor area, i.e. in the area of a freight compartment floor. By this means existing installation and assembly procedures can be called upon, so that the aeroplane fuselage can, for example, already be provided with a cockpit and in this manner tasks relating to the cockpit can already have been executed. Furthermore this has the advantage that the longitudinal guideway can be optimally aligned in the cockpit area, so that in any later use of the longitudinal guideway as a component of a freight loading system, for example, extensive conversion tasks can be dispensed with.

Advantageously the at least one cart is turned in the aeroplane fuselage with regard to its direction of travel. The result is that the carts can be turned in the fuselage and in this manner a kind of circuit is formed, so that full carts and empty carts cannot collide.

In one example of embodiment a multiplicity of aeroplane fuselages are arranged next to one another in the transverse direction. By this means a common system of rails and points can be accessed outside the fuselages, which greatly simplifies the scheduling of the carts in and out.

An inventive device for the installation of systems in an aeroplane fuselage, which is open at one end via an opening, has a longitudinal guideway extending through the opening into the aeroplane fuselage for purposes of accommodating at least one cart that can be moved along the longitudinal guideway. The longitudinal guideway in combination with the at least one cart allows a reduction of the installation time, and a reduction of the physical loading on the assembly personnel.

In one example of embodiment the longitudinal guideway has two guideway sections running parallel to one another, which are connected with one another via a curved section. By this means the carts can be turned with regard to their direction of travel in the aeroplane fuselage, so that the carts do not obstruct one another as they are scheduled in and out.

Provision is advantageously made outside the aeroplane fuselage for a points system for the scheduling of the carts in the required sequence. By this means the carts can be arranged in accordance with the required sequence. The points system is in particular of advantage if a plurality of aeroplane fuselages with systems to be fitted are arranged next to one another in the transverse direction, so that all the aeroplane fuselages can be addressed via a common points system.

For exact positioning of the systems and the further reduction of the physical loading on the assembly personnel the at least one cart can have a module carrier for the purpose of supporting the system during installation.

In one example of embodiment the longitudinal guideway is embodied as a guidance system of a freight loading system for cargo. This has the advantage that after completion of the installation of systems the longitudinal guideway does not have to be dismantled, and thus the overall assembly time for the aeroplane is reduced.

An inventive freight loading system for an aeroplane has a rail-type longitudinal guideway arranged in a fuselage and a multiplicity of sledges routed on the longitudinal guideway for the reception of cargo. In accordance with the invention the longitudinal guideway has a curved section for the purpose of changing the direction of, or turning, the sledges. The longitudinal guideway enables rapid loading and unloading of the aeroplane, i.e. the freight compartment, wherein by means of the curved section the sequence of the sledges in the freight compartment can be changed. Furthermore, the curved section allows the loading and unloading of the freight compartment through a side freight door, so that the inventive freight loading system can be deployed not only in freighter aeroplanes with a freight door on the front face side or rear face side, but also in passenger aeroplanes. The more rapid loading and unloading leads to a reduction of the ground times of the aeroplanes and thus to a cost saving. Furthermore the longitudinal guideway is relatively non-susceptible to malfunctions, damage and contamination, which is manifested in a reduced maintenance effort and in an increased service life. Furthermore, the longitudinal guideway has a lesser weight than, for example, the roll mats.

The sledges advantageously have positioning aids for accurate positioning of the cargo, in particular in the transverse direction of the freight compartment.

Other advantageous examples of embodiment are the subject of further subsidiary claims.

BRIEF DESCRIPTION OF THE DRAWINGS

In what follows preferred examples of embodiment of the invention are elucidated in more detail with the aid of schematic representations. Here.

DETAILED DESCRIPTION

In the figures the same constructive elements are allocated the same reference numbers.

Figure 1:
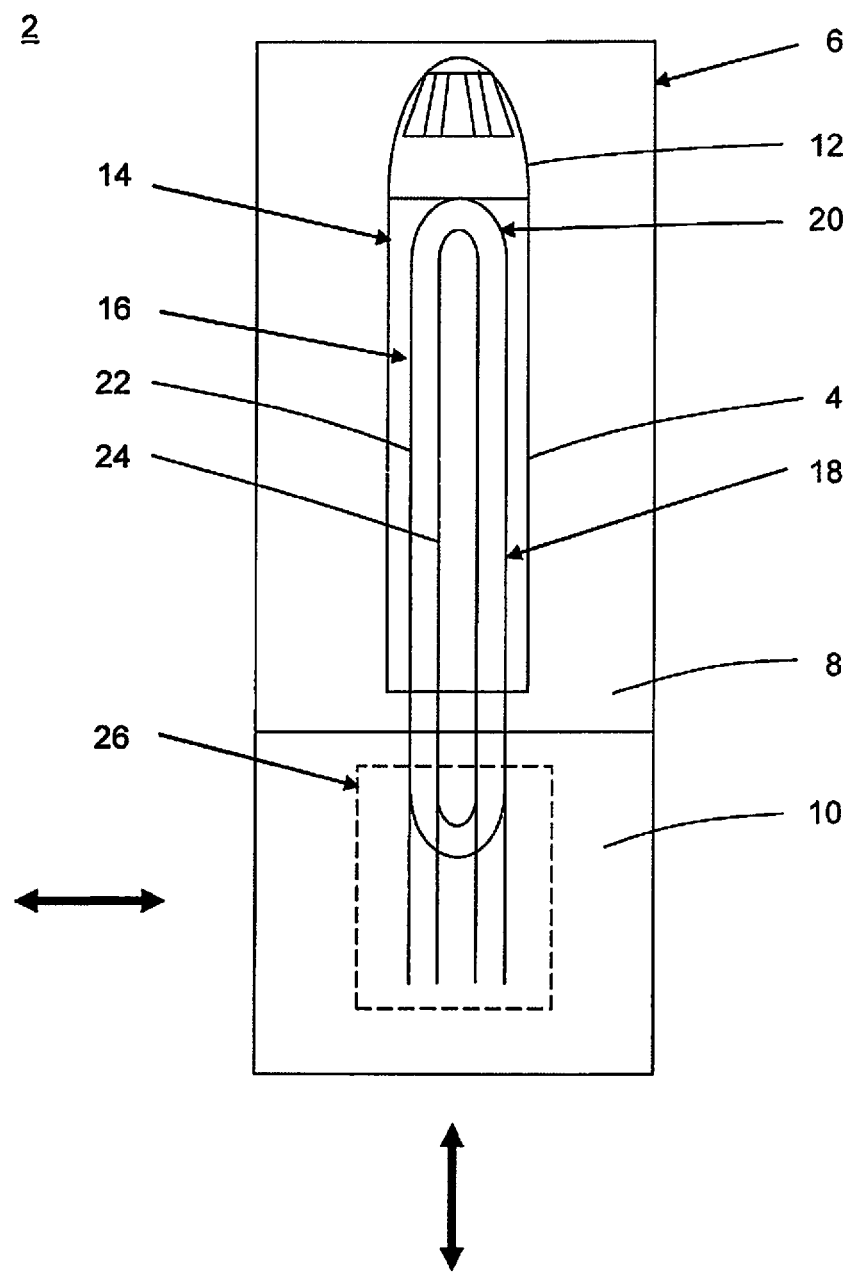
FIG. 1 shows a longitudinal section through an aeroplane fuselage, into which an inventive device extends.

FIG. 1 shows a plan view onto an inventive device 2 for the installation of systems, which extends in sections into an aeroplane fuselage 4 that is open on its rear face side. The installation of systems is undertaken in a build area 6, which is subdivided into an assembly area 8 and a fitting-out area 10. Only one build area 6 is represented, in an exemplary manner. However, it is advantageous if a multiplicity of such build areas 6 are arranged next to one another in the transverse direction.

The aeroplane fuselage 4 is arranged in the assembly area 8 with its rear opening facing towards the fitting-out area 10. The nose of the aeroplane fuselage 4 is closed off by an assembled cockpit 12.

The device 2 has a longitudinal guideway 14, which has two guideway sections 16, 18 running parallel to one another and extending in the longitudinal direction of the aeroplane fuselage 4, and a curved section 20 connecting the guideway sections 16, 18 with one another at the cockpit end of the fuselage. The guideway sections 16, 18 and the curved section 20 are formed in each case from two rails 22, 24 running parallel to one another. The guideway sections 14, 16 projecting out of the aeroplane fuselage 4 into the fitting-out area 10 are connected with a points system 26 in the fitting-out area for the preparation of the carts 28, 30 shown in FIG. 2. The scheduling in and out of the carts 28, 30, is undertaken, depending upon the management provided by the points system 26, in the longitudinal direction or transverse direction of the aeroplane fuselage 4, as indicated by the double arrows.

Figure 2:
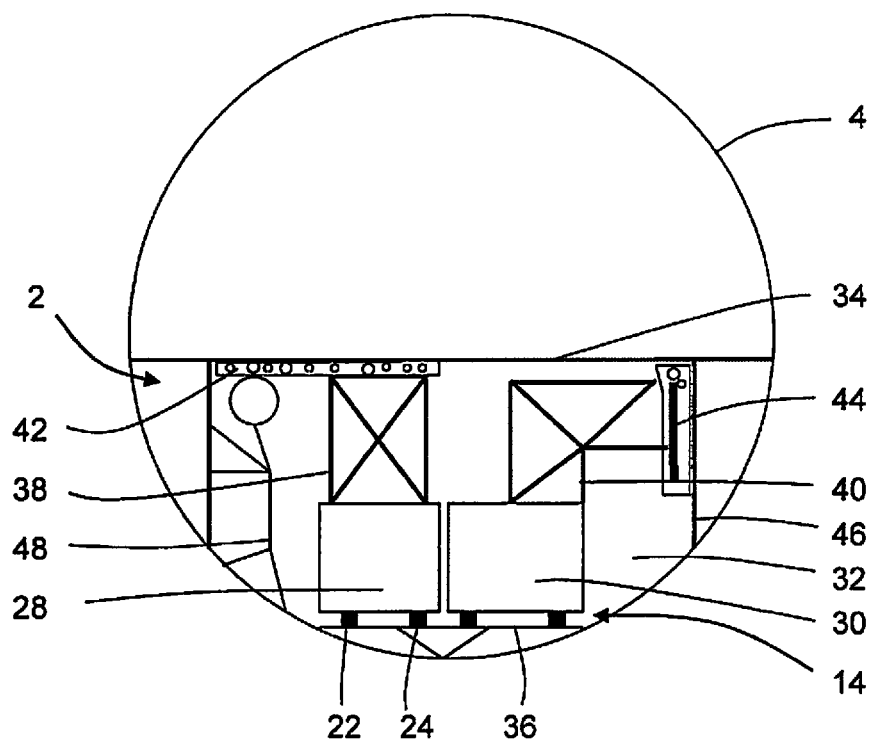
FIG. 2 shows a cross-section through the aeroplane fuselage of FIG. 1.

In accordance with FIG. 2 the device 2 is arranged in a freight compartment 32, i.e. in an underfloor area of the aeroplane fuselage 4 underneath a passenger deck 34. The longitudinal guideway 14 is securely attached to a primary structure reinforcement 36 extending in the transverse direction of the aeroplane fuselage 4. The carts 28, 30 are routed on the longitudinal guideway 14, and are fitted in each case with a module carrier 38, 40 for the positioning and support of a system module, 42, 44, in the course of its installation on a section of the primary structure, such as for example a transverse beam, not shown, supporting the passenger deck 34, or on a section of a vertical support 46.

The module carriers 38, 40 are embodied in an adjustable manner and allow for the raising and lowering, pivoting and support of the system module in question 42, 44.

The system modules, 42, 44 contain, for example, a multiplicity of runs of electrical, pneumatic or hydraulic systems, not numbered, or themselves serve as mountings for individual runs. Furthermore the carts 28, 30 are fitted with the tools, accessories, small parts and components necessary for installation of the systems in question. The installation of the system modules, 42, 44, and also the movement of the carts 28, 30 along the longitudinal guideway 14 is undertaken by the appropriate assembly personnel.

In what follows a preferred method for the installation of systems is described: The aeroplane fuselage 4 to be fitted with systems 42, 44 is scheduled into the build area 6 and aligned such that its opening on the front face side or rear face side is arranged in the direction of the fitting-out area 10 opposite to an interface with the points system 26. The longitudinal guideways 14 are then installed in the underfloor area 32. The carts 28, 30 are now fitted out in the fitting-out area 10 with the system modules 42, 44, tools, small parts, and similar, necessary for installation of the systems in question in the required sequence. The fitting-out of the carts 28, 30 is preferably undertaken by the suppliers. The fitted-out carts 28, 30 are moved by means of the points system 26 along, for example, the left-hand guideway section 16 shown in FIGS. 1 and 2 in the aeroplane fuselage 4 to the position in question. The system module, 42, 44 in question is installed and the cart 28, 30, is routed along the right-hand guideway section 18 out of the aeroplane fuselage 4, and via the points system 26 a new fitted-out cart is supplied for the installation of a further system. After the installation of all system modules 42, 44, the aeroplane fuselage 4 is scheduled out of the build area 6 and is delivered, for example, to a final assembly area.

Figure 3:
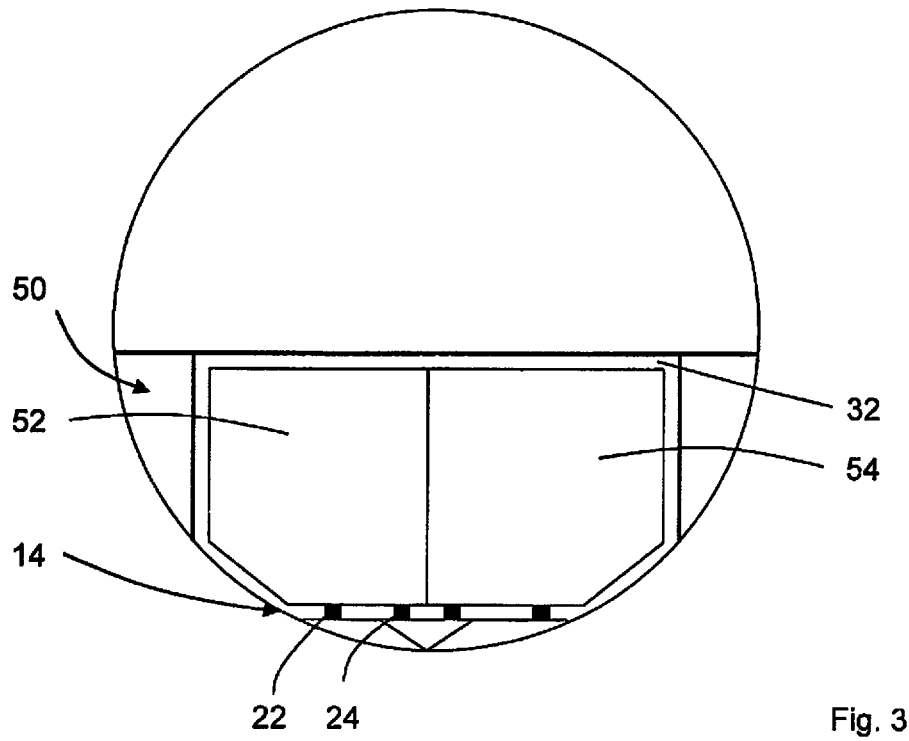
FIG. 3 shows a cross-section through the aeroplane fuselage of FIG. 1 with containers fitted.

In accordance with FIG. 3 the longitudinal guideway 14 of the inventive device 2 serves as a guidance system for a freight loading system 50. Containers 52, 54 are positioned next to one another in the transverse direction on the longitudinal guideway 14. The containers 52, 54 are, for example, arranged onto the longitudinal guideway 14 via a side freight door, not represented, and by means of sledges, not shown. The sledges can be traversed along the longitudinal guideway 14, so that the containers 52, 54 can be positioned in the freight compartment 32 in the aeroplane longitudinal direction. The containers 52, 54 are securely fixed onto the sledges. The locking of the sledges on the longitudinal guideway 14 is undertaken, for example, by means of appropriate claw systems or by means of appropriate recesses in the guideway sections 16, 18, or the curved section 20. For purposes of positioning in the transverse direction of the freight compartment 32 the sledges have appropriate positioning aids, which enable a displacement of the containers 52, 54 in the transverse direction.

Disclosed is a method for the installation of systems in an aeroplane fuselage 4, a device 2 with a rails system 14 for the execution of the method, and a freight loading system 50, which uses the rails system 14 as a guidance system for cargo 50, 52.

REFERENCE SYMBOL LIST

2 Device
4 Aeroplane fuselage
6 Build area
8 Assembly area
10 Fitting-out area
12 Cockpit
14 Longitudinal guideway
16 Guideway section
18 Guideway section
20 Curved section
22 Rail
24 Rail
26 Points system
28 Cart
30 Cart
32 Freight compartment
34 Passenger deck
36 Reinforcement
38 Module carrier
40 Module carrier
42 System module
44 System module
46 Vertical support
48 Assembly personnel
50 Freight loading system
52 Container
54 Container

What is claimed is:

1. A device for the installation of systems in an aeroplane fuselage which has an opening, the opening being a front face side opening or rear face side opening, comprising:
  a longitudinal guideway extending through the opening into the aeroplane fuselage for accommodation of at least one cart that can be moved along the longitudinal guideway, wherein the longitudinal guideway has two parallel guideway sections, which are connected with one another via a curved section arranged in the aeroplane fuselage, and wherein the at least one cart is able to enter into the aeroplane fuselage through the opening along one of the two parallel guideway sections, is able to change direction along the curved section, and is able to exit from the aeroplane fuselage through the opening along the other of the two parallel guideway sections.

2. The device in accordance with claim 1, wherein a points system is provided for the purpose of scheduling the at least one cart in the required sequence.

3. The device in accordance with claim 2, wherein the points system has a multiplicity of interfaces for the purpose of supplying to a multiplicity of aeroplane fuselages.

4. The device in accordance with claim 1, wherein the at least one cart has a module carrier for the purpose of supporting the system during installation.

5. The device in accordance with claim 1, wherein the longitudinal guideway is a guidance system of a freight loading system.

6. A freight loading system for an aeroplane, comprising:
  a rail-type longitudinal guideway arranged in an aeroplane; and
  a multiplicity of sledges routed on the rail-type longitudinal guideway for the accommodation of cargo, wherein the rail-type longitudinal guideway has a curved section for the purpose of altering the direction of the sledges, and wherein the rail-type longitudinal guideway has two parallel guideway sections, which are connected with one another via the curved section, wherein at least one sledge of the multiplicity of sledges is able to enter into an opening of an aeroplane fuselage along one of the two parallel guideway sections, is able to alter direction along the curved section, and is able to exit from the aeroplane fuselage through the opening along the other of two parallel guideway sections.

7. The freight loading system in accordance with claim 6, wherein the sledges have positioning aids for accurate positioning of the cargo.

\* \* \* \* \*